June 27, 1939.    E. BUGATTI    2,163,826
COUPLING DEVICE INTENDED ESPECIALLY FOR RAILROAD VEHICLES
Filed Nov. 29, 1935
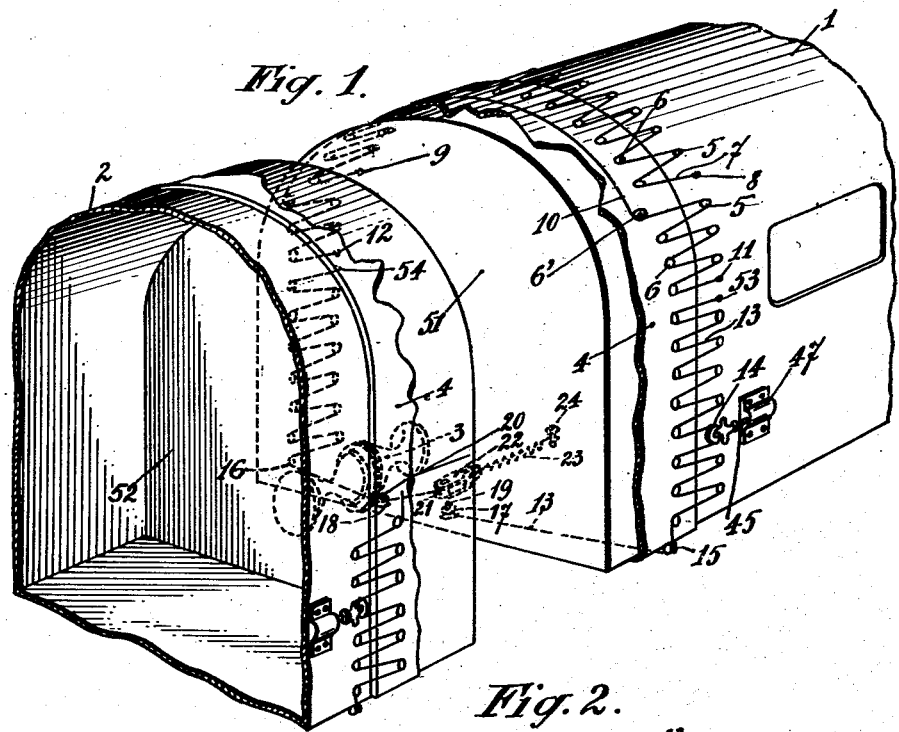
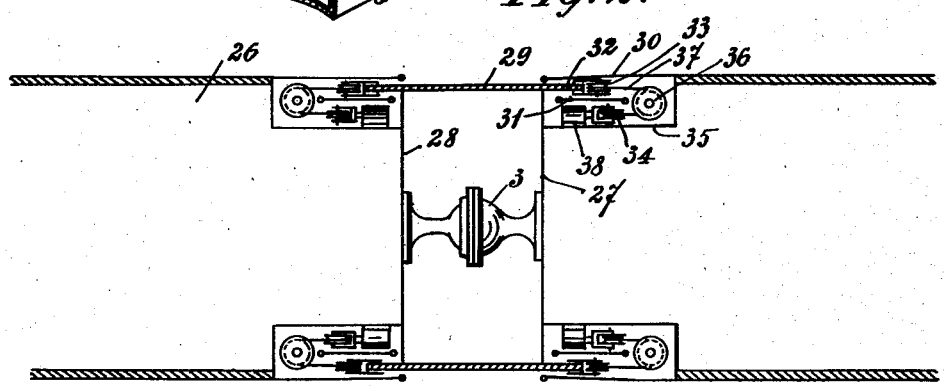
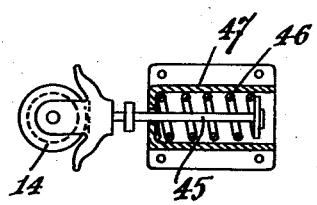
Inventor:-
Ettore Bugatti
By Mauro + Lewis
Attorneys Patented June 27, 1939

2,163,826

UNITED STATES PATENT OFFICE 2,163,826

COUPLING DEVICE INTENDED ESPECIALLY FOR RAILROAD VEHICLES

Ettore Bugatti, Molsheim, France

Application November 29, 1935, Serial No. 52,236
In France December 4, 1934

9 Claims. (Cl. 105—15)

In order to join together the elements of articulated vehicles or the cars of a train, it has been known for a long time to make use of accordion plaited bellows the width of which does not exceed that of a door. It has already been suggested to give these bellows a width corresponding exactly to the section of the vehicles that are to be joined together, but when the vehicles are running along a curve, inconveniences arise by reason of the considerable elongation of this bellows on the outer side and the contraction on the inner side of the curve. Furthermore, the plaits of these accordion-shaped structures are disadvantageous from the point of view of aerodynamics.

Another solution that was suggested consists in replacing the accordion shaped bellows by a belt of an elastic material, mounted with an initial tension so as to ensure the continuity of the profile of the vehicles. The stress to which the material is subjected, which is normal when the vehicles are running along a straight portion of the track, becomes excessive when the vehicles are running or staying on a curve of small radius.

The object of the present invention is to provide a device for joining together adjacent vehicles which obviates the drawbacks above mentioned.

According to the essential feature of the present invention, this joining device includes a belt surrounding over a certain length the adjacent ends of the vehicles and secured to said vehicles by means of elastic fastenings. According to the invention, the belt may be made either of a non-elastic or little elastic material, or of an elastic material, but associated with means for artificially limiting its deformation.

With a joining device of this kind, the belt remains applied against the walls of the vehicles, whatever be their relative angular position, and it ensures an excellent joint from an aerodynamic point of view, without subjecting the material or materials of which the belt is made to an excessive fatigue. The necessary deformations are assumed by the elastic fastenings.

These elastic fastenings advantageously include elastic ropes, cables or bands, coil springs, etc., and they are preferably mounted with a certain initial or preliminary tensioning on the vehicles supposed to be in line with each other.

The belt which constitutes the main element of the joining device is made of one or several parts. It is, for instance, made of leather, ordinary cloth, rubberized cloth, rubber, etc. When it is made of rubber or another material which is quite elastic, the belt is provided with ropes, cables, small rods, or equivalent means for preventing too considerable an expansion thereof.

If desired, the belt may penetrate into the body of the vehicles, instead of surrounding them and, for instance, it may be engaged between two walls of each of the bodies, these walls being disposed in adjacent relation very close to each other.

The elastic fastenings are either on the outside of both the vehicles and the belt, or on the inside of both, or again on the inside of the belt and the outside of the vehicles, or inversely.

The arrangement and the shape of the elastic fastenings are susceptible of many modifications. The simplest case is that of individual fastening means having each a point of fixation on the belt and a point of fixation on the vehicle. Either on the belt or on the vehicle, or again on both, a point of fixation can be common to two adjacent fastenings. The whole of the fastenings then has the aspect of a zig-zag shaped line. Several adjoining fastenings may be formed by a cable, a rope, a band, or a spring, passing alternately, in zig-zag fashion from the points of fixation on the vehicle to the points of fixation on the belt. Of course, there are other possible arrangements.

In an embodiment of the invention, the connection between the belt and one vehicle is ensured by one or several elastic elements, such as cables, ropes, bands, springs, etc., fixed at both ends and passing freely over guides, such as pulleys, alternately carried by the belt and the vehicle; the pulleys or equivalent means are rigidly or elastically connected to the belt or the vehicle. The pulleys may be fixed either directly to the body of the vehicle or to a frame fixed to said body. In some cases, they are supported by connecting rods or the like themselves fixed either to the belt or to the vehicle.

If desired, the ring consists of two annular elements themselves attached together as above explained. In particular, the two vehicles to be coupled together may be each provided with a joining belt and the two adjoining belts of the vehicles are rigidly secured to each other, or possibly, they may be attached elastically, for instance as above explained.

Other features of the present invention shall result from the following detailed description of some specific embodiments thereof, reference being had to the accompanying drawing, given merely by way of example and in which:

Fig. 1 is a perspective diagrammatical view with parts broken away, showing two coupled car bodies having a joining belt in accordance with one embodiment of my invention.

Fig. 2 is a horizontal sectional view showing two coupled car bodies having a joining belt which is attached thereto according to another embodiment of my invention.

Fig. 3 shows at an enlarged scale and in axial cross section a tensioning device as used in the embodiment of Fig. 1.

Referring to Fig. 1, I have shown the adjacent ends of two car bodies 1, 2 which are connected to each other through a coupling member conventionally indicated at 3. Positioned to overlap the adjacent ends of the car bodies so as to lie substantially flush with the outer surfaces of the same, is a flexible belt or like structure 4 which is made for instance of a non-elastic or little elastic material. The belt 4 is attached to each of the car bodies 1 and 2 through similar devices so that it will be sufficient to describe its connection with one of the car bodies.

Around the periphery of each car body adjacent the end faces 51, 52 of the same are located rows of supports or guiding elements, such as rings, hooks, buttons or the like; considering for instance the car body 1, the supports or guiding elements in the corresponding row are shown at 5; another row of like supports or guiding elements 6 is likewise located around the periphery of the belt 4 adjacent its edge. The rows of supports or guiding elements 5 and 6 may be substantially parallel with each other as shown.

For providing a permanent connection, in use, between the belt 4 and the car body 1, at least one length of flexible resilient or resiliently tensioned material is passed in zig-zag fashion from a support 5 on the car body 1 to a support 6 on the belt and vice versa. In the example Fig. 1, I have shown an upper elastic cord or like element 7 which is fastened at one end thereof, for instance to the car body 1 at 8, and then runs in zig-zag fashion, passing on a support 6 on the belt 4 then on a support 5 on the car body 1 and so on, and is finally fastened through its other end, for instance to the car body 1 at 9. I have also shown another similar elastic element 10, fastened at 11 to the car body 1, then passing in zig-zag fashion from supports 6 to supports 5 and vice-versa along one side of the car body; from the uppermost support 6' on the belt 4, the element 10 extends over the arched upper portion of the car body, substantially in a vertical transverse plane, then is again disposed in zig-zag fashion along the rear face of the car body and is finally fastened at 12.

Furthermore, I have shown a third elongated element 13, the ends of which are fastened for instance to the car body 1 at 53, 54 and which is disposed in zig-zag fashion between supports 5 and 6 on both sides of the car body; one or more of the supports may be a pulley or like guiding element, one of which is shown at 14; pulley 14, as best shown on Fig. 3, is pivotally mounted on a rod 45 which is slidably carried in a casing 47 and is urged by a spring 46 within the casing; the latter is shown on Fig. 1 attached to the car body 1. It will be understood that the structure shown on Fig. 3 forms a resilient tensioning device for element 13.

In the example of Fig. 1, where it is assumed that the belt does not cover the lower flat surfaces of the car bodies, the element 13 passes substantially in straight line from side pulleys or like supports 15, 16 to adjacent pulleys, 17, 18 pivotally carried on the lower surface of car body 1 by stationary pins 19, 20 or the like, and thence passes over a further pulley 21 which is located substantially centrally below the car body 1; the pulley 21 is pivoted in a floating strap 22 and a spring 23 connects the strap 22 with an anchorage 24 on the car body lower surface; hence a further resilient tensioning device is provided for element 13.

It will be readily appreciated that while the element 13 may be made of a resilient material like elements 7 and 10, it may also be made of a flexible, non-resilient or unstretchable material, since resiliency may be provided for solely by the tensioning devices.

In the modification of Fig. 2, I have shown car bodies 25, 26 which on each side, adjacent their end faces 27, 28, have two closely adjacent walls; since on both sides, both car bodies are similarly constructed, it will be sufficient to describe the construction for one of them. The belt 29 has its edges projecting between the closely adjacent walls such as shown at 30, 31 for the car body 25. Carried by the belt 29 along the edge 32 thereof, is a row of pulleys such as 33, mounted for rotation about an axis at right angles to the belt. A similar row of pulleys such as 34 is likewise provided for rotation about axes at right angles to the belt, on the car body 25; pulley 34 has been shown as carried by a further wall 35 which encloses and shelters the various pulleys and the flexible element to be described later on. Carried by the car body 25, is a further row of pulleys mounted for rotation about axes at right angles to those of pulleys 33, 34; such an additional pulley is shown at 36 as being supported from the wall 35. It should be understood that the three rows of pulleys are located substantially parallelly with each other around the periphery of the car body adjacent its end face, as has been described with reference to Fig. 1. It is further seen that the wall 35 forms together with the wall 30, a recess wherein the various pulleys are enclosed and sheltered.

Flexible elements such as 37 pass over the various pulleys, as shown, so as to form loops in plane view and zig-zag lines in elevation view in like manner to element 7 on Fig. 1. As previously described with reference to Fig. 1, the flexible element 37 may be resilient or it may be non-resilient; in the latter case, resiliency is provided for by resilient tensioning devices such as described with reference to Fig. 1; in the showing, it has been assumed that pulley 34 is supported from the wall 35 through a resilient tensioning device 38 of the type illustrated by Fig. 3.

Obviously, Figs. 1 to 3 merely illustrate particular embodiments of this invention but the latter is not limited thereto.

In a general manner, while I have, in the above description, disclosed several practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a train of at least two railway vehicles coupled together, a device for joining with each other the adjacent respective ends of said vehicles which comprises, in combination, a flexible belt extending from one end of one vehicle to the adjacent end of the other vehicle along their peripheries and substantially flush with the general outlines of said vehicles, a plurality of projecting elements carried by the belt and said respective ends of the vehicles respectively, located around the periphery of the same, adjacent the edges thereof, and at least one cable passing in a slidable manner about said elements so as to pass in zig-zag manner from one projecting element of the belt to a projecting element of one vehicle end and vice versa, over at least a portion of the periphery of said belt, said cable having each of its ends attached to either the corresponding vehicle or the belt, whereby the edges of the belt are kept along the peripheries of the corresponding vehicles despite relative movements of said vehicles with respect to each other.

2. In a train of at least two railway vehicles coupled together, a device for joining with each other the adjacent respective ends of said vehicles which comprises, in combination, a flexible belt extending from one end of one vehicle to the adjacent end of the other vehicle along their peripheries and substantially flush with the general outlines of said vehicles, a plurality of pulleys carried by the belt and said respective ends of the vehicles respectively, located around the periphery of the same, adjacent the edges thereof, and at least one cable passing in a slidable manner about said pulleys so as to extend in a zigzag manner from one pulley of the belt to a pulley of one vehicle end and vice-versa, over at least a portion of the periphery of said belt, said cable having each of its ends attached to either the corresponding vehicle or the belt, whereby the edges of the belt are kept along the peripheries of the corresponding vehicles despite relative movements of said vehicles with respect to each other.

3. In a train of at least two railway vehicles coupled together, a device for joining with each other the adjacent respective ends of said vehicles which comprises, in combination, a flexible belt extending from one end of one vehicle to the adjacent end of the other vehicle along their peripheries and substantially flush with the general outlines of said vehicles, a plurality of pulleys carried by the belt and said respective ends of the vehicles respectively, located around the periphery of the same, adjacent the edges thereof, at least one cable passing in a slidable manner about said pulleys so as to extend in a zig-zag manner from one pulley of the belt to a pulley of one vehicle end and vice-versa, over at least a portion of the periphery of said belt, said cable having each of its ends attached to either the corresponding vehicle or the belt, and elastic means connected with the corresponding vehicle, for stretching said cable, whereby the edges of the belt are kept along the peripheries of the corresponding vehicles despite relative movements of said vehicles with respect to each other.

4. In a train of at least two vehicles coupled together, the combination of a flexible belt adapted to form an arched passage extending from one of the adjacent ends of the vehicles to the other of the adjacent ends, a row of guiding elements carried by the belt located around the periphery of the same adjacent the edge thereof, another row of guiding elements carried by a vehicle end located around the periphery of the same adjacent the edge thereof, a length of flexible material mounted in slidable engagement with the guiding elements and running in a zig-zag fashion from a guiding element on the vehicle end to a guiding element on the belt and vice versa, said length having each of its ends attached to either the corresponding vehicle or the belt, and elastic means connected with the corresponding vehicle, operatively engaging the length of flexible material, for tensioning said length of flexible material.

5. In a train of at least two vehicles coupled together, a device for joining with each other the adjacent respective ends of the vehicles which comprises, in combination, a flexible belt extending from one end of one vehicle to the adjacent end of the other vehicle along their peripheries, a plurality of guiding elements carried by the belt and the ends of the vehicles, respectively, located around the periphery of the same, adjacent the edges thereof, and at least one length of flexible elastic material mounted in slidable engagement with said guiding elements and disposed in zig-zag fashion so as to pass from one guiding element of the belt to a guiding element of one vehicle end and vice-versa, over at least a portion of the periphery of the belt, said length having each of its ends attached to either the corresponding vehicle or the belt.

6. In a train of at least two vehicles coupled together, a device for joining with each other the adjacent respective ends of the vehicles, which comprises, in combination, a flexible belt extending from one end of one vehicle to the adjacent end of the other vehicle along their peripheries, a plurality of guiding elements carried by the belt and the ends of the vehicles, respectively, located around the periphery of the same, adjacent the edges thereof, and at least one length of elastically stretchable material mounted under tension in slidable engagement with said guiding elements and disposed in a zig-zag fashion, so as to pass from one guiding element of the belt to a guiding element of one vehicle end and vice versa, over at least a portion of the periphery of the belt, said length having each of its ends attached to either the corresponding vehicle or the belt.

7. In a train of at least two vehicles coupled together, the combination of a flexible belt adapted to form an arched passage extending from one of the adjacent ends of the vehicles to the other end, a row of supports provided on the belt, located around the periphery of the same, adjacent an edge thereof, another row of supports provided on that vehicle end which is adjacent to said edge of the belt, said second row of supports being located around the periphery of said vehicle end, adjacent the edge thereof, and means, including an elongated flexible connection running from the belt to said vehicle end and vice versa in a zig-zag fashion and having each of its ends attached to either the last named vehicle end or the belt, for connecting elastically the two rows of supports together.

8. In a train of at least two vehicles coupled together, the combination of a flexible belt adapted to form an arched passage extending from one of the adjacent ends of the vehicle to the other end, a row of supports provided on the belt, located around the periphery of the same, adjacent an edge thereof, another row of supports provided on that vehicle end which is adjacent to said edge of the belt, said second row of supports being located around the periphery of said vehicle end, adjacent the edge thereof, guiding elements carried by said supports, at least one of said guiding elements being carried elastically by the corresponding support, and a length of flexible material mounted in slidable engagement with said guiding elements and running in a zig-zag fashion from a guiding element on the vehicle end to a guiding element on the belt and vice versa, said length having each of its ends attached to either the vehicle end or the belt.

9. In a train of at least two vehicles coupled together having adjacent double-walled body ends forming opposite recesses, the combination of a flexible belt extending from one recess to the other recess, having its opposite ends housed in said recesses, a row of supports provided on one of the vehicles within the corresponding recess, located around the inner periphery of said vehicle, adjacent the edge thereof, another row of supports provided on the belt adjacent the edge thereof which lies adjacent said recess, the second row of supports being located around the periphery of the belt, and means, including an elongated flexible connection running from the belt to the last named vehicle and vice versa in a zig-zag fashion, for connecting elastically the two rows of supports together, said connection having each of its ends attached to either the last named vehicle or the belt.

ETTORE BUGATTI.